United States Patent
Kanbur

(10) Patent No.: US 10,895,193 B2
(45) Date of Patent: Jan. 19, 2021

(54) THERMOSTAT ASSEMBLY WITH TANDEM VALVES

(71) Applicant: KIRPART OTOMOTIV PARCALARI SANAYI VE TICARET ANONIM SIRKETI, Bursa (TR)

(72) Inventor: Hikmet Kanbur, Bursa (TR)

(73) Assignee: KIRPART OTOMATIV PARCALARI SANAYI VE TICARET ANONIM SIRKETI, Bursa (TR)

( * ) Notice: Subject to any disclaimer, the term of this patent is extended or adjusted under 35 U.S.C. 154(b) by 162 days.

(21) Appl. No.: 16/092,217

(22) PCT Filed: May 20, 2016

(86) PCT No.: PCT/TR2016/050148
§ 371 (c)(1),
(2) Date: Oct. 9, 2018

(87) PCT Pub. No.: WO2017/200497
PCT Pub. Date: Nov. 23, 2017

(65) Prior Publication Data
US 2020/0200067 A1 Jun. 25, 2020

(51) Int. Cl.
*F01P 7/16* (2006.01)
*F16K 1/44* (2006.01)
*F16K 31/00* (2006.01)
*F01P 7/14* (2006.01)

(52) U.S. Cl.
CPC .................. *F01P 7/16* (2013.01); *F16K 1/44* (2013.01); *F16K 31/002* (2013.01); *F01P 2007/146* (2013.01)

(58) Field of Classification Search
CPC ...... F01P 7/16; F01P 2007/146; F16K 31/002
See application file for complete search history.

(56) References Cited

U.S. PATENT DOCUMENTS

| | | | |
|---|---|---|---|
| 3,385,320 A | 5/1968 | Cusack | |
| 2009/0114169 A1* | 5/2009 | Heldberg | F16K 11/0873 123/41.1 |

(Continued)

FOREIGN PATENT DOCUMENTS

| | | |
|---|---|---|
| EP | 0587981 A1 | 3/1994 |
| GB | 390933 A | 4/1933 |

(Continued)

*Primary Examiner* — Long T Tran
(74) *Attorney, Agent, or Firm* — Bayramoglu Law Offices LLC

(57) ABSTRACT

This invention relates to a thermostat assembly with tandem valve for cooling circulation systems of internal combustion engines which includes a solid tandem valve or a hollowed tandem valve to control a flow of a coolant fluid by opening or closing an output connection by allowing double side flow entrance of flow into the valve construction to achieve low pressure drops and due to this double side entrance of flow it is possible to activate the mechanism with lower forces. As a result, a mechanism with high flow rates and with low pressure drops in limited geometries becomes obtainable.

8 Claims, 8 Drawing Sheets

(56) References Cited

U.S. PATENT DOCUMENTS

| | | | | |
|---|---|---|---|---|
| 2011/0233287 A1* | 9/2011 | Park | ............ | F01P 7/16 |
| | | | | 236/34.5 |
| 2013/0200167 A1* | 8/2013 | Auweder | ............ | F01P 7/16 |
| | | | | 236/93 R |
| 2017/0308105 A1* | 10/2017 | Roman | ............ | G05D 23/022 |
| 2018/0274431 A1* | 9/2018 | Tauschel | ............ | F01P 7/167 |

FOREIGN PATENT DOCUMENTS

| WO | 9111640 A1 | 8/1991 |
|---|---|---|
| WO | 2013178798 A1 | 12/2013 |

* cited by examiner

THERMOSTAT ASSEMBLY WITH TANDEM VALVES

CROSS REFERENCE TO RELATED APPLICATIONS

This application is the national phase entry of International Application No. PCT/TR2016/050148, filed on May 20, 2016, the entire contents of which are incorporated herein by reference.

TECHNICAL FIELD

This invention relates to a thermostat assembly with tandem valve for cooling circulation systems of the internal combustion engines for achieving very low pressure drop figure of coolant at high flow rates and for achieving lower actuation force requirement for opening or closing the valve.

BACKGROUND

In the internal combustion engines with liquid coolant, thermostat is main control device of the cooling circulation system. By controlling a valve with an actuator inside of the thermostats, the coolant is provided to flow through the required outputs with required flow rates.

To provide a proper circulation, it is important to achieve low pressure drops through valve in desired flow rates. In the known situation of the art, there are three different types of thermostat valve structures to implement a proper thermostat mechanism. These valve structures are namely poppet type valve, sleeve type valve and slider type valve.

For the thermostat which have poppet type valve, a force is applied to valve plate by coolant pressure which is calculated with coolant pressure multiplies by projection area of valve. If projection area of valve increased for achieving lower pressure drops of coolant stream through valve, the required actuator power or pushing capability should be increased proportionally for opening the thermostat. Therefore, due to limited power of wax actuator or other type of actuators, it is not possible to increase the size of poppet valve besides some engine architecture does not allow using sleeve type valve structure.

Another known situation of art is sleeve type valve structures. Even though sleeve type valve has pressure balanced feature which helps to increase size of valve, it is not an economic reliable solution. Also, lower pressure drop target is achievable on slider type valve construction; it is also not economical and has some reliability concern and has application limits.

BRIEF DESCRIPTION OF THE DRAWINGS

This invention is explained by following figures detailed. Figures are only for example. On these figures: This invention relates to a thermostat assembly with tandem valve for cooling circulation unit.

FIG. 1 3D view of the thermostat assembly with solid tandem valve

REFERENCE NUMBERS

Figure 1:
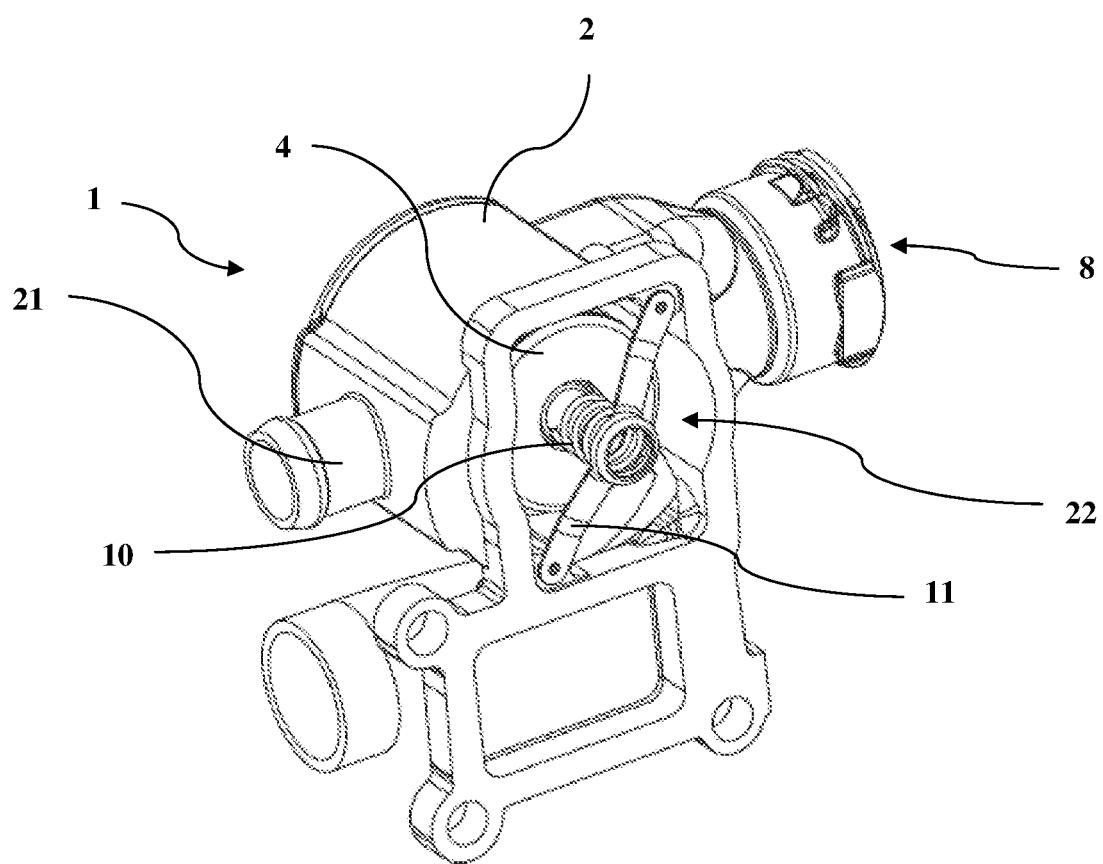
Figure 2:
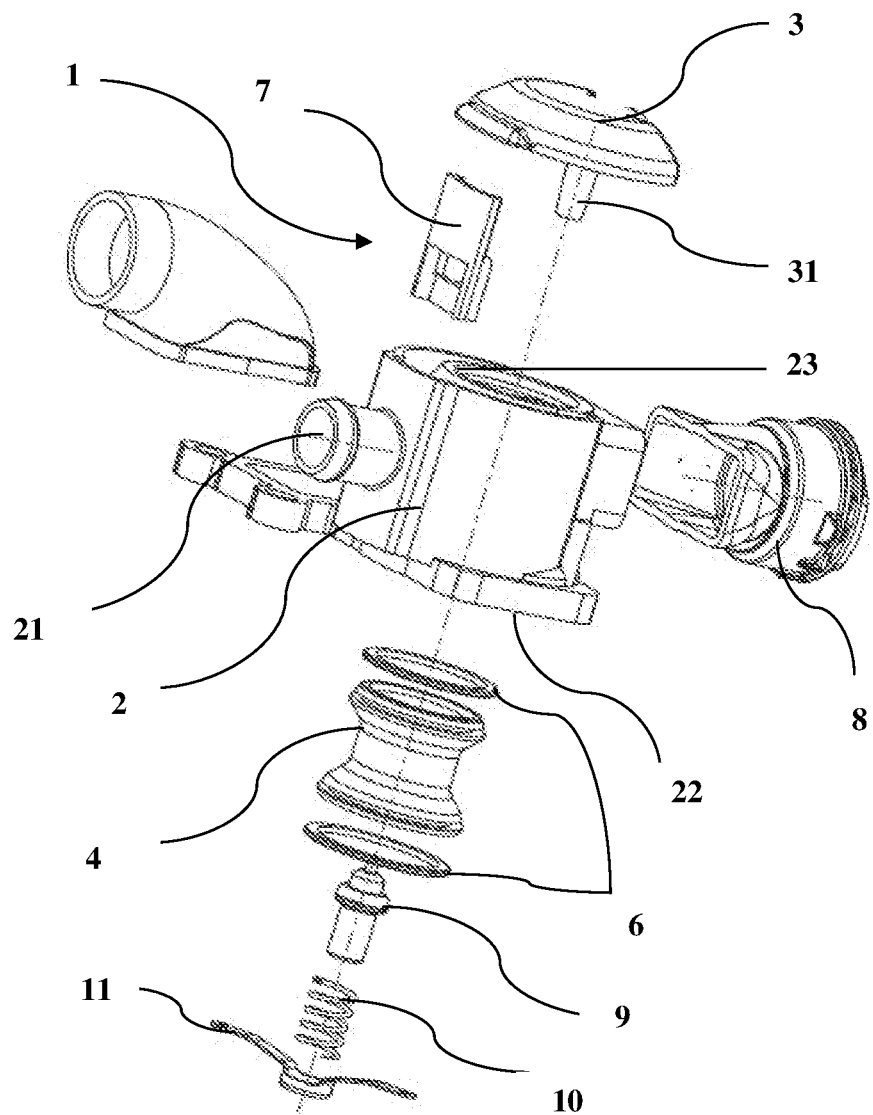
FIG. 2 Exploded view of the thermostat assembly with solid tandem valve
Figure 3:
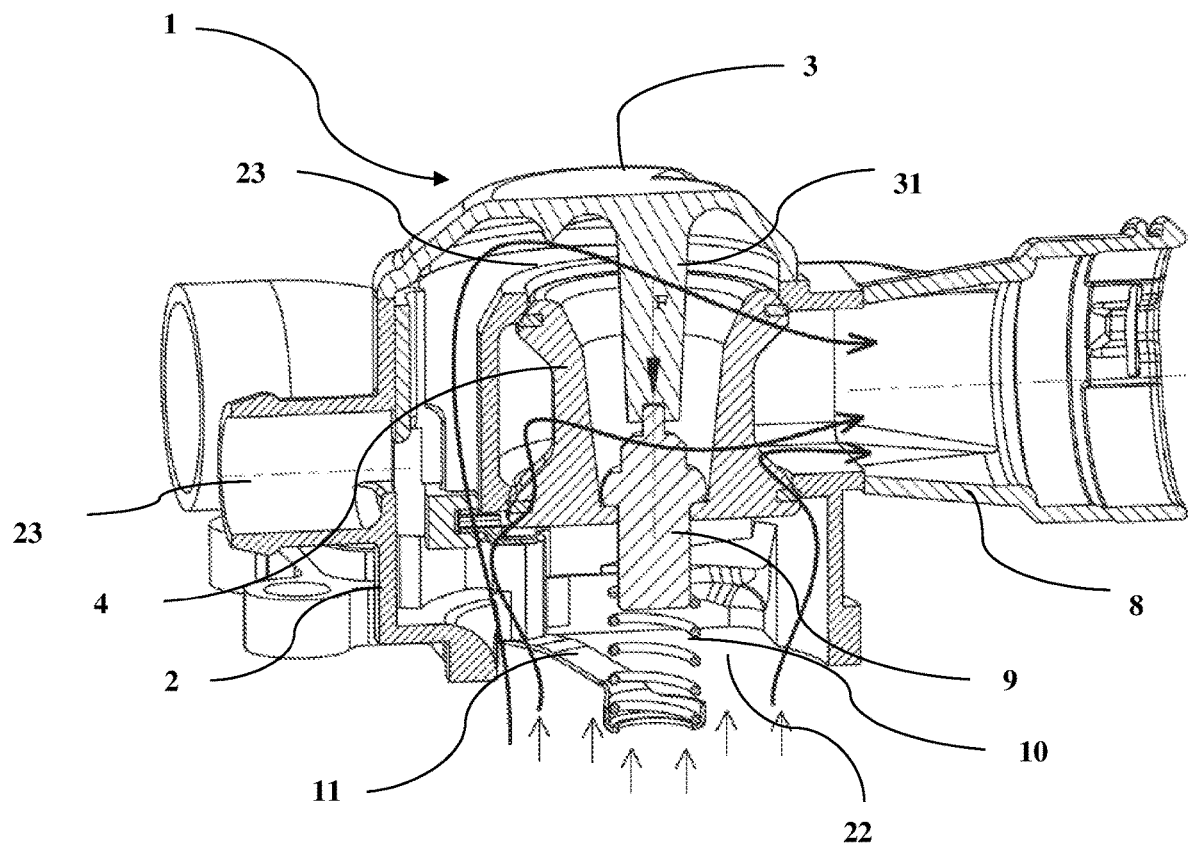
FIG. 3 Stream lines of coolant in the thermostat assembly with solid tandem valve FIG. 4 3D view of the solid tandem valve FIG. 5 3D view of the solid tandem valve and thermal actuator FIG. 6 3D view of the thermostat assembly with hollowed tandem valve FIG. 7 Exploded view of the thermostat assembly with hollowed tandem valve FIG. 8 Stream lines of coolant in the thermostat assembly with hallowed tandem valve FIG. 9 3D view of the hollowed tandem valve and thermal element FIG. 10 Projection view of Piston support with guide ribs in Cover FIG. 11 A cross section view of Thermostat with tandem valve
Figure 4:
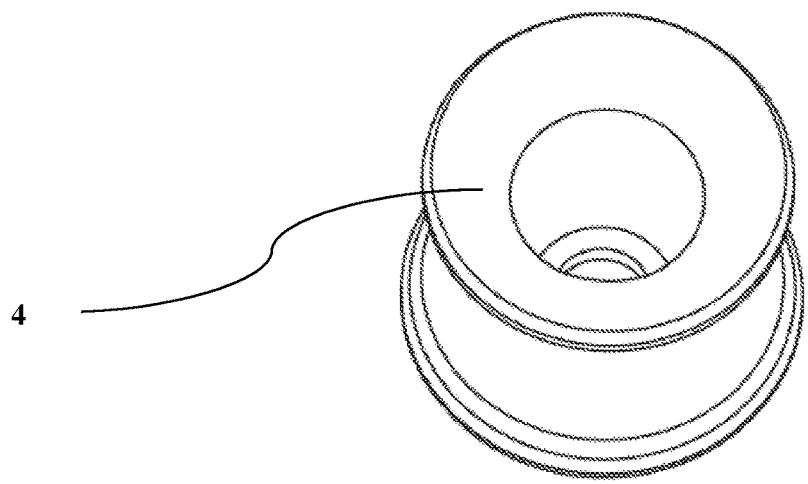
Figure 5:
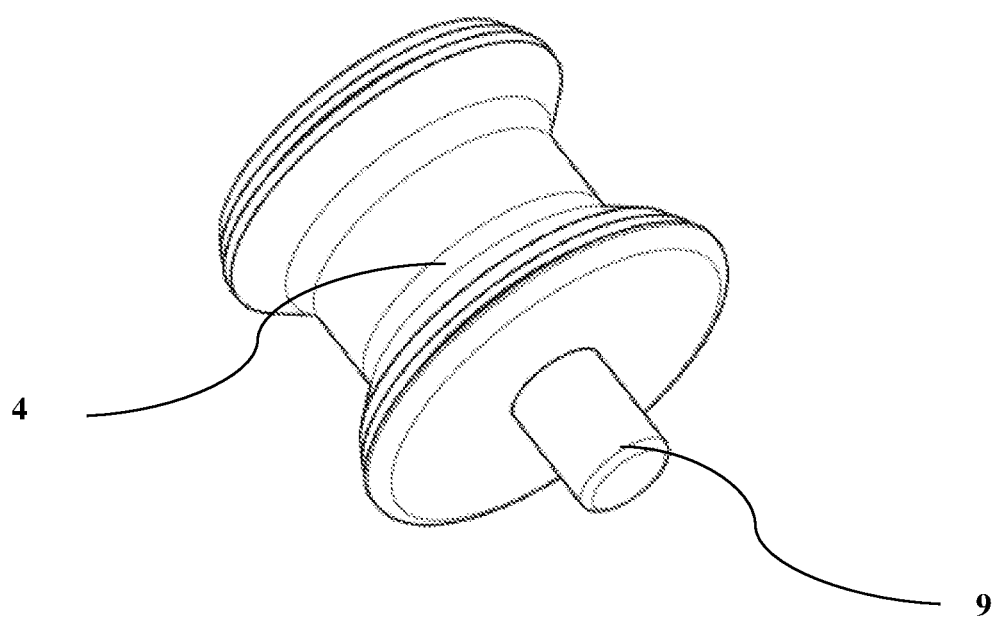
Figure 6:
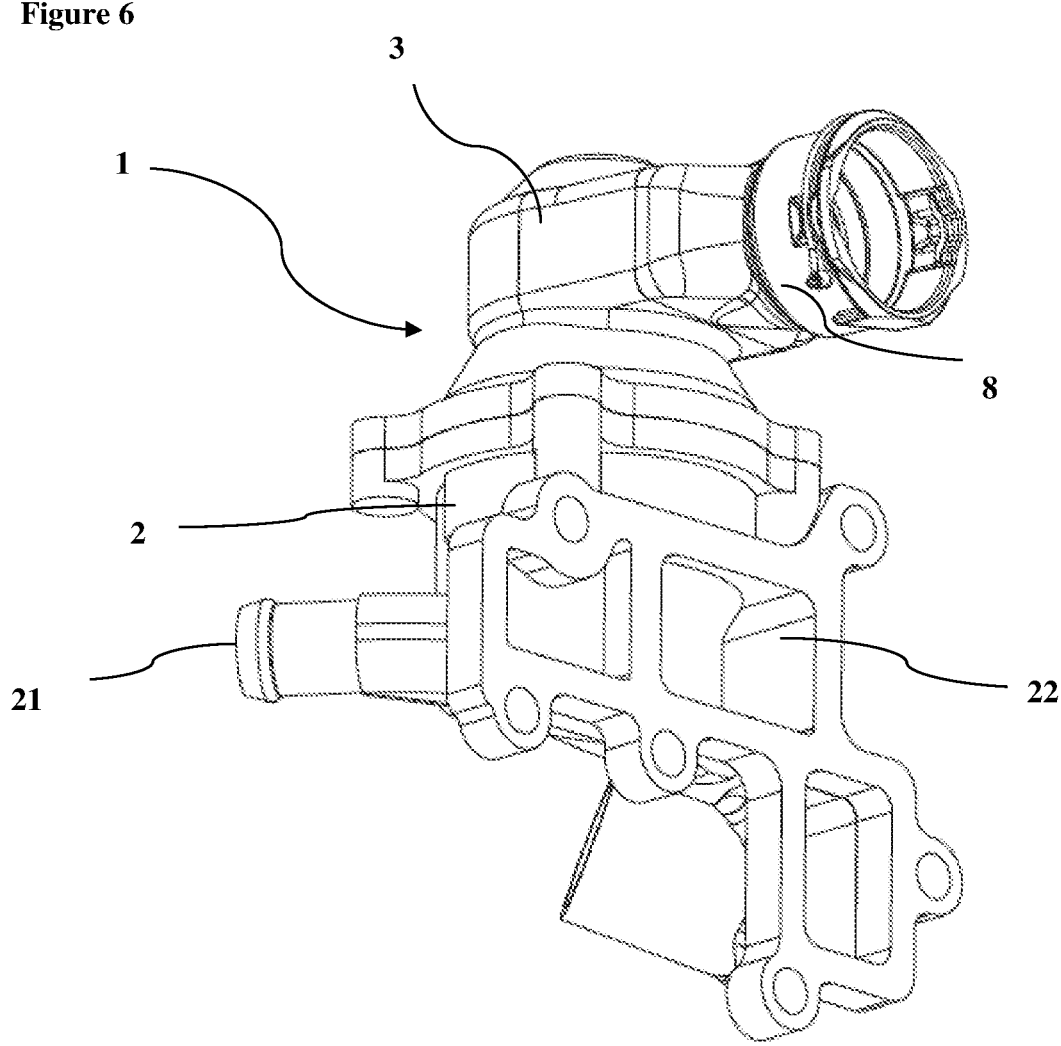
Figure 7:
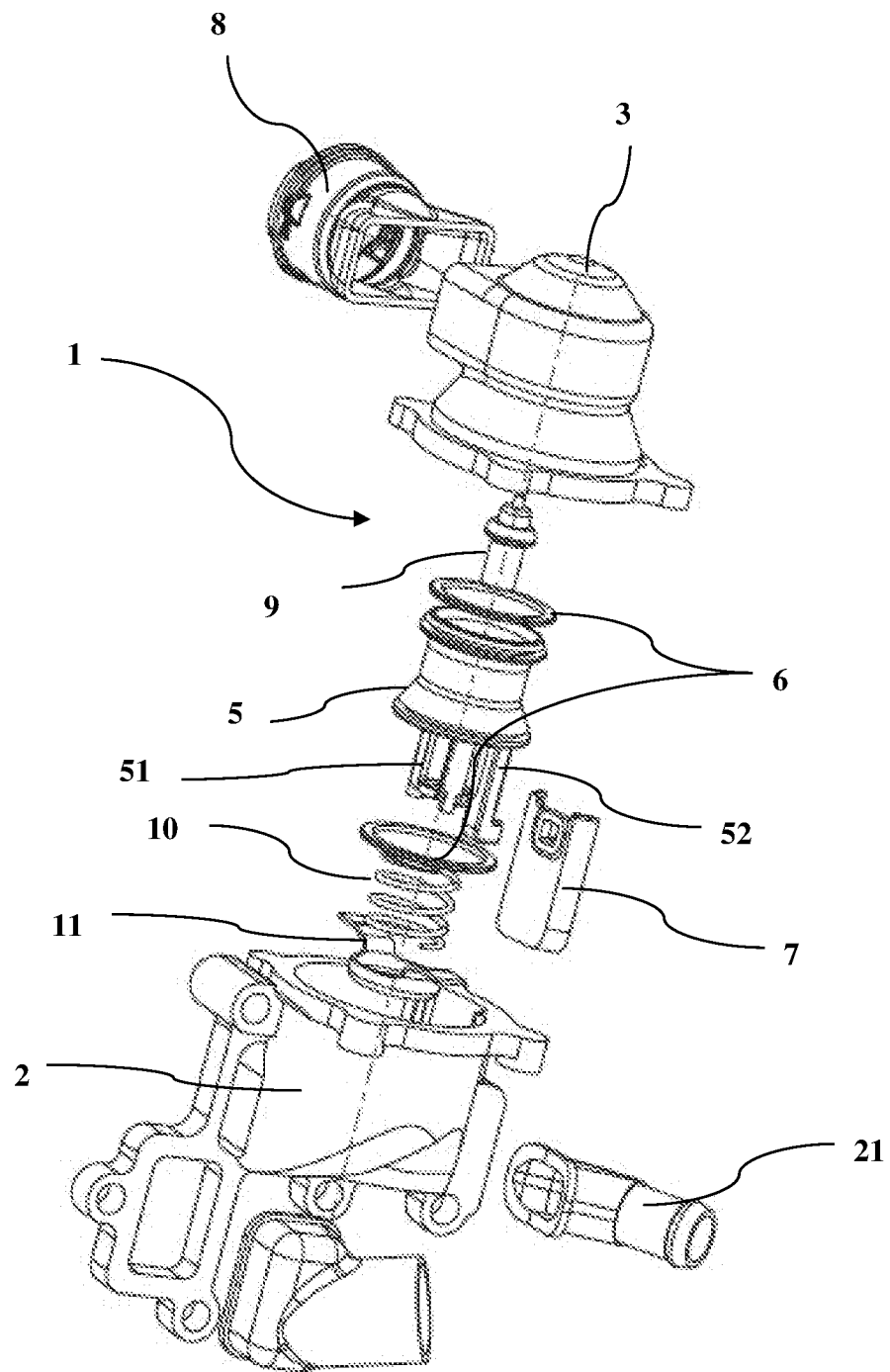
Figure 8:
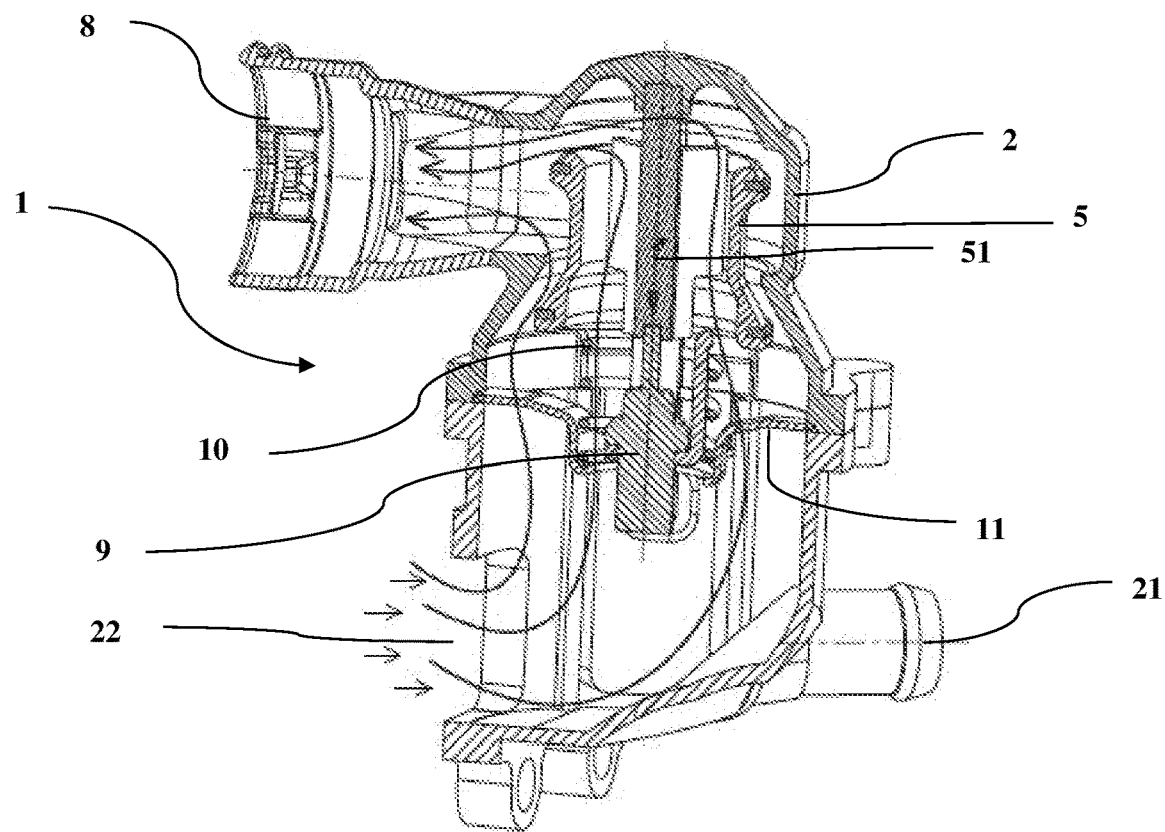
Figure 9:
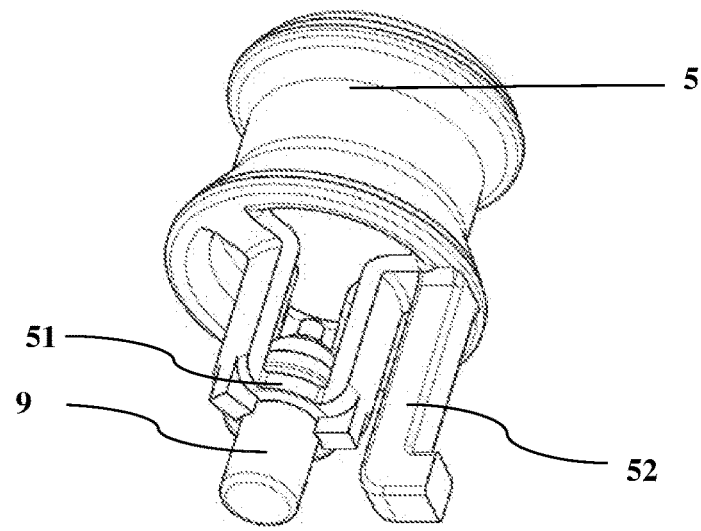
Figure 10:
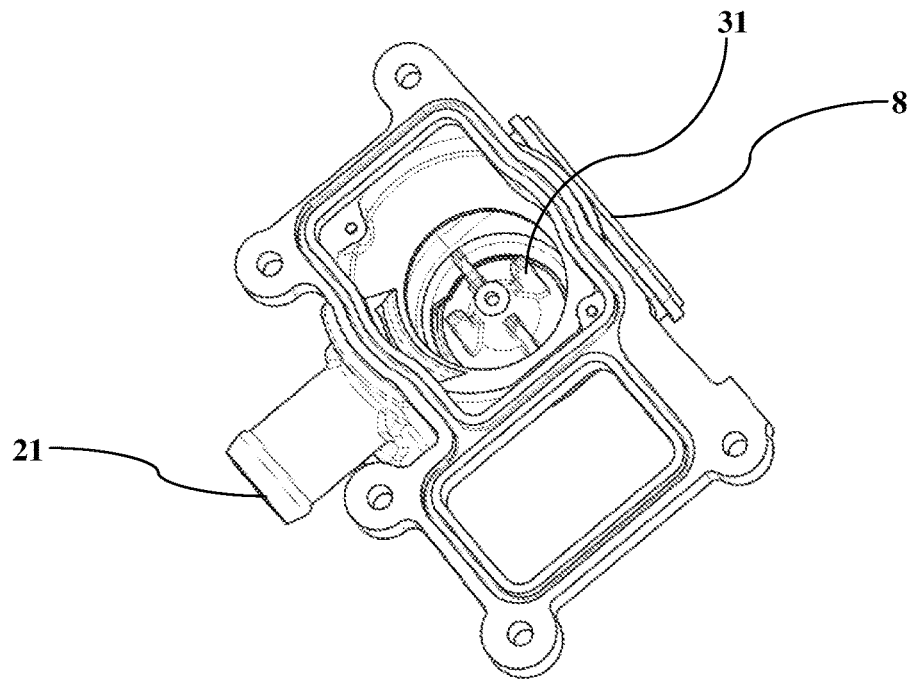
Figure 11:
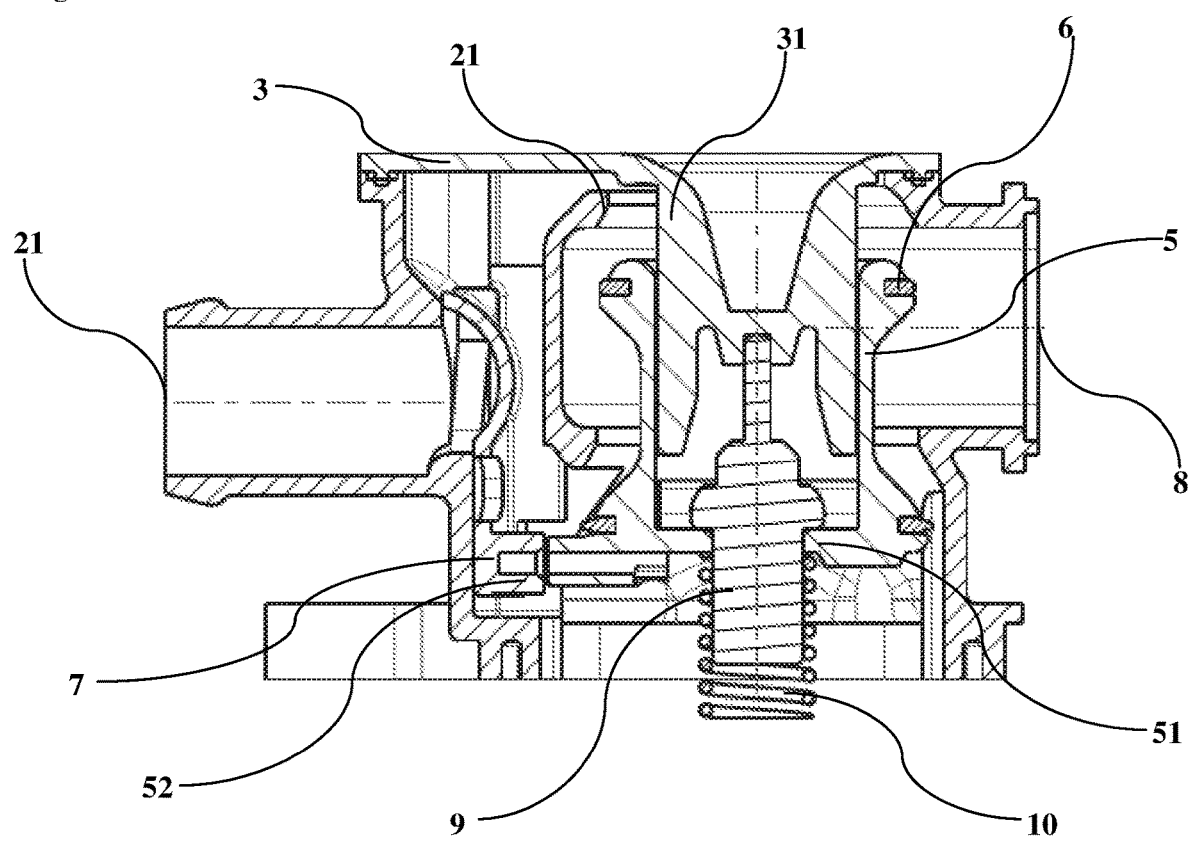

There are references on the figures below and here are descriptions of references:
1. Thermostat assembly with tandem valve
2. Body
21 By-pass output
22 Inlet
23 Valve seat
3. Cover
31 Piston support extension with guide ribs
4. Solid tandem valve
5. Hollowed tandem valve
51 Support face
52 Connector extension
6. Elastomer sealing ring
7. By-pass valve
8. Radiator output
9. Thermal actuator
10. Spring
11. Spring Retainer

DETAILED DESCRIPTION

A thermostat assembly with tandem valve (1) which is a component of the coolant circulation system of the internal combustion engines essentially comprises:
- at least one body (2), which has a cylindrical shape
- at least one by-pass output (21), which is in fact a hose connection and provides a connection for by-pass circuit,
- at least one inlet (22) which is in fact an opening on the bottom side of body (2) and which transfers the coolant from engine block,
- at least a valve seat (23) which is created by protruding from the body (2),
- at least one cover (3) which is positioned on the open side of the body (2),
- at least one piston support extension with guide ribs (31) created by protruding from the cover (3),
- at least one solid tandem valve (4), the outside of it has a hyperboloid shape and the inside of it has a frusto-conical shape, and which is installed inside of the body (2),
- at least one elastomer sealing ring (6) which is installed to grooves on the joint faces between the solid tandem valve (4) and valve seat (23) to provide sealing,
- at least one by-pass valve (7) which is slider type and attached to the solid tandem valve (4) to control the coolant flow from by-pass output (21) by means of up-down movement of solid tandem valve (4),
- at least one radiator output (8) which has suitable connectors for connecting the cooling circuit and for welding to body (2), at least one thermal actuator (9) which generates the required force to move the solid tandem valve (4) and slider type by-pass valve (7) down related with the temperature, at least one spring (10) which apply force to the thermal actuator (9) on opposite direction proportionally with the tension caused by the force generated by the thermal actuator (9), at least one spring retainer (11) which provides housing for the spring (10) for pushing the thermal actuator (9) and solid tandem valve (4) against valve seat.

In an embodiment of the invention, the thermostat assembly with tandem valve (1) is implemented by a solid tandem valve (4) which is installed inside a valve seat (23). There are cover (3), body (2) and radiator output (8) and there are control elements such as slider type by-pass valve (7), solid tandem valve (4), thermal actuator (9) and spring (10) and other elements like elastomer sealing ring (6) and spring retainer (11). All these are fitted inside body (2).

There is a cover (3) which is assembled on the body (2) and which is in fact as a cover for the body (2) and on which there is a piston support extension with guide ribs (31) which is created by protruding from the cover (3). The piston support extension with guide ribs (31) provides a coaxial movement for the solid tandem valve (4) by means of the engaging structure with the pin of thermal actuator (9).

The slider type by-pass valve (7), which controls the coolant flow through the by-pass output (21), is installed inside of the body (2). By means of the lift force generated by the thermal actuator (9), slider type by-pass valve (7) moves up or down simultaneously with the solid tandem valve (4). In this way, the control of the by-pass output (21) should be controlled. Another embodiment of the invention is that electrically heated actuator or actuator driven by electric motor can be used instead of thermal Actuator (9) for actuating the solid tandem valve (4) by a remote control unit if a self actuating response is not preferred.

The solid tandem valve (4) which controls the flow through the radiator output (8) is installed inside the valve seat (23) to provide housing for the solid tandem valve (4). The valve seat (23) has a cylindrical geometry which allows a double sided flow entrance into flow control construction. Hence the mechanism achieves low pressure drops and high flow rates. This is one of the innovative aspects for this invention. The solid tandem valve (4) inside of the valve seat (23) moves up or down by means of the force created by whether thermal actuator (9) or the spring (10). The required force to control the thermostat assembly with tandem valve (1) is lower with respect to the known situation of the art by means of the projection area of the surfaces of the thermostat assembly with tandem valve (1) structure which is almost equal on both sizes. This is another innovative aspect for this invention.

The movement of the solid tandem valve (4) is provided by the thermal actuator (9) which is filled with a thermal sensible compound. When temperature increases, this thermal sensible compound starts to expand and starts to lift the thermal actuator's (9) pin by means of this expansion. In case the lift force becomes greater than the force of the spring (10), solid tandem valve (4) starts to move downward. When the temperature decreases, the thermal sensible compound inside the thermal actuator (9) starts to shrink. When the force of the spring (10) becomes greater than the lift force of the thermal actuator (9) this time solid tandem valve (4) starts to move upward by means of the force of the spring (10).

Solid tandem valve (4) has nearly equal projection area at both sides therefore the required actuator force is significantly low when it is closed. This thermostat assembly with tandem valve (1) will increase the streaming flow rate due to doubled valve opening.

Thermal actuator (9) is fitted by means of the piston support extension with guide ribs (31) on the cover (3) and spring retainer (11) and also the spring (10) is fitted by spring retainer (11). Hereby a coaxial movement of the thermal actuator (9) and the solid tandem valve (4) is provided through the valve seat (23)

In another embodiment of the invention, a hollowed tandem valve (5) is used instead of the solid tandem valve (4). When the thermostat assembly with tandem valve (1) housing construction has no way to direct the coolant stream to the other side of solid tandem valve (4), stream is transferred to other valve side through the inner opening of valve by making it hollowed tandem valve (5) structure. The thermostat assembly with tandem valve (1) with hollowed tandem valve (5) which is a component of the coolant circulation system essentially comprises:

at least one body (2), at least one by-pass output (21) which is in fact a hose connection and provides a connection for by-pass circuit, at least one inlet (22) which is in fact an hole on the bottom side of body (2) and which transfers the coolant from engine block, at least a valve seat (23) which is created by protruding from the body (2), at least one piston support extension with guide ribs (31) created by protruding close end of the body (2), at least one hollowed tandem valve (5), the outside of it has a hyperboloid shape and the inside of it has a frusto-conical shape and which is installed inside of the body (2), at least one elastomer sealing ring (6) which is installed to channels on the joint faces between the hollowed tandem valve (5) and the coolant outlets inside of the body (2) to provide sealing, at least one support face (51), which is extending over the hollowed tandem valve (5) and has a hollow shape, at least one connector extension (52) which is connected to hollowed tandem valve (5) and has a L shaped, at least one by-pass valve (7) which is slider type and is attached to connector extension (52) to control the coolant flow from by-pass output (21), at least one radiator output (8) which has suitable connectors for connecting the cooling circuit and for welding the mounting part on the body (2), at least one thermal actuator (9) which attached on support face (51), generates the required force to move the hollowed tandem valve (5) and slider type by-pass valve (7) down related with the temperature, at least one spring (10) which apply force to the thermal actuator (9) on opposite direction proportionally with the tension caused by the force generated by the thermal actuator (9), at least one spring retainer (11) which provides housing for the spring (10) and the thermal actuator (9) by means of the cylindrical hole and which is installed between the cover and the body (2).

In an embodiment of the invention, a thermostat assembly with tandem valve (1) is implemented by a hollowed tandem valve (4) which is installed inside of the body (2) to control the fluid through the radiator output (8). There is a hollowed tandem valve (5) inside of the body (2) which is to supply the joint faces for the valves of the hollowed tandem valve (5). By overlapping or separating of the hollowed tandem valve (5) and the overlapping surface of the body (2) the flow of the coolant is controlled.

The hollowed tandem valve (5) is installed inside of the body (2), in which there is a suitable geometry for this installation. Such there is a piston support extension with guide ribs (31) inside of the body (2) which is in fact a protrusion of the body (2) and which also has 3 piston support extension with guide ribs (31) for keeping hollowed tandem valve (5) in its movement axis while opening and closing action. The thermal actuator (9) and the spring (10) are fitted inside of the support face (51) which is extension of the hollowed tandem valve (5). In this part, thermal actuator (9) which is a thermal sensible actuator, moves up or down according to the temperature and by means of the lift force of the spring (10). Due to this movement, the hollowed tandem valve (5) and slider type by-pass valve (7) moves up or down simultaneously. In this way, the control of the fluid is provided.

In another embodiment of the invention, a thermostat assembly with tandem valve (1) is implemented by a hollowed tandem valve (4) which is installed inside of the cover (3) to control the fluid through the radiator output (8). There is a hollowed tandem valve (5) inside of the cover (3) which is to supply the joint faces for the valves of the hollowed tandem valve (5). By overlapping or separating of the hollowed tandem valve (5) and the overlapping surface of the cover (3) the flow of the coolant is controlled. The hollowed tandem valve (5) is installed inside of the cover (3) and the body (2), in which there is a suitable geometry for this installation. Such there is a piston support extension with guide ribs (31) inside of the cover (3) which is in fact a protrusion of the cover (3) and which also has 3 piston support extension with guide ribs (31) for keeping hollowed tandem valve (5) in its movement axis while opening and closing action. The thermal actuator (9) and the spring (10) are fitted inside of the support face (51) which is extension of the hollowed tandem valve (5). In this part, thermal actuator (9) which is a thermal sensible actuator, moves up or down according to the temperature and by means of the lift force of the spring (10). Due to this movement, the hollowed tandem valve (5) and slider type by-pass valve (7) moves up or down simultaneously. In this way, the control of the fluid is provided.

The support face (51) and spring (10) is fitted by the spring retainer (11). In case temperature increase, the thermo-sensible compound inside of the thermal actuator (9) expands and starts to lift the pin. In this way thermal actuator (9) starts to move downward and simultaneously hollowed tandem valve (5) and slider type by-pass valve (7) starts to move downward too. By the way hollowed tandem valve (5) starts to stress the spring (10). In case temperature decreases, this time thermal actuator (9) moves upward by means of the force generated by the stressed spring (10). This way the control of the thermostat assembly with tandem valve (1) is provided.

By means of the double side flow entrance into flow control construction, the mechanism achieves low pressure drops and high flow rates like the valve mechanism of the solid tandem valve (4). This is one of the innovative aspects for this invention. The hollowed tandem valve (5) moves up or down by means of the force created by whether thermal actuator (9) or the spring (10). The required force to control the thermostat assembly with tandem valve (1) is lower with respect to the known situation of the art by means of the projection area of the surfaces of the thermostat assembly with tandem valve (1) which is almost equal on both sizes. This is another innovative aspect for this invention.

When the radiator output is open, a uniform flow is provided by means of the thermostat assembly with tandem valve (1). Inside and around of the valve flow is regulated, so that turbulence effects are not occurred.

The projection areas for the hollowed tandem valves (5) are almost equal on both sides just like the solid tandem valve (4) one therefore the force need to activate the mechanism is significantly low.

What is claimed is:

1. A thermostat assembly with tandem valve for cooling circulation systems of internal combustion engines, comprising:
   at least one body having a cylindrical shape,
   at least one by-pass output, wherein the by-pass output is a hose connection providing a connection to a by-pass circuit,
   at least one inlet, wherein the inlet is an opening on a bottom side of the body and transfers a coolant from an engine block to inside of the thermostat assembly,
   at least one radiator output providing a connection to a cooling circuit,
   at least one thermal actuator generating a required force related with the temperature,
   at least one spring, wherein the spring applies a force to the thermal actuator on opposite direction proportionally with a tension caused by a force generated by the thermal actuator,
   at least one spring retainer, wherein the spring retainer provides a housing for the spring for pushing up the thermal actuator,
   at least one cover positioned on an open side of the body,
   at least one piston support extension with guide ribs, wherein the piston support extension with guide ribs is created by protruding from the cover and provides coaxial movement by means of the engaging structure with the pin of the thermal actuator,
   and characterized by; in order to achieve low pressure drops and high flow rates; comprising
   at least two valve seats, wherein the valve seats form together a cylindrical geometry protruding from the body and allow double sided flow through the radiator output,
   at least one solid tandem valve, wherein an outside wall of the solid tandem valve has a hyperboloid shape and an inside wall of the solid tandem valve has an inverted frusto-conical shape and, the solid tandem valve is installed inside mentioned cylindrical geometry formed by the valve seats, wherein mentioned solid tandem valve is moved down by the force generated by the thermal actuator and is moved up by the force generated by the spring,
   at least two elastomer sealing rings, wherein the elastomer sealing rings are installed to grooves on joint faces of said the solid tandem valve in order to provide sealing,
   at least one by-pass valve, wherein the by-pass valve is a slider type and attached to the solid tandem valve to control the coolant to flow through the by-pass output by means of up-down movement of the solid tandem valve.

2. The thermostat assembly with tandem valve of claim 1, wherein the solid tandem valve comprises two valves with different radiuses.

3. The thermostat assembly with tandem valve of claim 1, wherein the solid tandem valve allows a double side flow entrance into a flow control construction.

4. The thermostat assembly with tandem valve of claim 1, wherein the solid tandem valve has a nearly equal projection area placed on opposite sides of the solid tandem valve to allow the thermostat assembly with tandem valve controlling the solid tandem valve motion with significantly lower forces under same coolant pressure.

5. A component of a coolant circulation system, comprising a thermostat assembly with tandem valve, wherein the thermostat assembly with tandem valve comprises:
  at least one body,
  at least one by-pass output, wherein the by-pass output is a hose connection providing a connection to a by-pass circuit,
  at least one inlet, wherein the inlet is a hole on a bottom side of the body and transfers a coolant from an engine block to inside of the thermostat assembly,
  at least one radiator output providing a connection to a cooling circuit,
  at least one thermal actuator generating a required force related with the temperature,
  at least one spring, wherein the spring applies a force to the thermal actuator on opposite direction proportionally with a tension caused by a force generated by the thermal actuator,
  at least one spring retainer, wherein the spring retainer provides a housing for the spring and the thermal actuator by means of a cylindrical hole installed between a cover and the body
  at least one piston support extension with guide ribs, wherein the piston support extension with guide ribs is created by protruding to a close end of the body and provides coaxial movement by means of engaging structure with the pin of the thermal actuator,
  and characterized by; in order to achieve low pressure drops and high flow rates; comprising
  at least two valve seats, wherein the valve seats form together a cylindrical geometry protruding from the body and allow double sided flow through the radiator output,
  at least one hollowed tandem valve, wherein an outside wall of the hollowed tandem valve has a hyperboloid shape and an inside wall of the hollowed tandem valve has a frusto-conical shape and, the hollowed tandem valve is installed inside mentioned cylindrical geometry formed by the valve seats, wherein mentioned hollowed tandem valve is moved down by the force generated by the thermal actuator and is moved up by the force generated by the spring,
  at least two elastomer sealing rings, wherein the elastomer sealing rings are installed to channels on joint faces of said hollowed tandem valve in order to provide sealing,
  at least one support face, wherein the support face extends over the hollowed tandem valve and has a hollow shape where the thermal actuator is fitted inside,
  at least one by-pass valve, wherein the by-pass valve is a slider type and is attached to the hollowed tandem valve by means of at least one connector extension protruding from the hollowed tandem valve for driving the by-pass valve in order to control a coolant to flow from the by-pass output.

6. The thermostat assembly with tandem valve of claim 5, wherein the hollowed tandem valve comprises two valves with different radiuses.

7. The thermostat assembly with tandem valve of claim 5, wherein the cover is positioned on an open side of the body.

8. The thermostat assembly with tandem valve of claim 7, wherein the thermostat assembly with tandem valve further comprises a piston support extension with guide ribs created by protruding from the cover in order to provide coaxial movement by means of the engaging structure with the pin of the thermal actuator.

* * * * *